US009992171B2

(12) United States Patent
Ramachandra Rao et al.

(10) Patent No.: US 9,992,171 B2
(45) Date of Patent: Jun. 5, 2018

(54) METHOD AND SYSTEM FOR DIGITAL RIGHTS MANAGEMENT OF ENCRYPTED DIGITAL CONTENT

(71) Applicant: SONY CORPORATION, Tokyo (JP)

(72) Inventors: Ravi Honnavalli Ramachandra Rao, Bangalore (IN); Vishnuteja Chokkanahalli, Bangalore (IN); Ajay Maruti Gaonkar, Bangalore (IN)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 14/531,591

(22) Filed: Nov. 3, 2014

(65) Prior Publication Data

US 2016/0173455 A1 Jun. 16, 2016

(51) Int. Cl.
*H04L 29/06* (2006.01)
*H04L 9/08* (2006.01)

(52) U.S. Cl.
CPC ........ *H04L 63/0428* (2013.01); *H04L 9/0866* (2013.01); *H04L 63/0861* (2013.01); *H04L 63/10* (2013.01); *H04L 2209/34* (2013.01); *H04L 2209/603* (2013.01)

(58) Field of Classification Search
CPC .................................................. H04L 63/0428
See application file for complete search history.

(56) References Cited

U.S. PATENT DOCUMENTS

| 4,405,829 A | 9/1983 | Rivest et al. |
| 5,953,422 A * | 9/1999 | Angelo .................. G06F 21/34 713/185 |
| 6,363,485 B1 * | 3/2002 | Adams .................. H04L 9/3231 713/186 |
| 6,961,452 B2 | 11/2005 | Fujii |
| 8,417,960 B2 | 4/2013 | Takahashi et al. |
| 8,565,497 B2 | 10/2013 | Nada et al. |
| 8,745,405 B2 | 6/2014 | Pizano et al. |
| 9,276,741 B2 * | 3/2016 | Mantri .................. H04L 9/0869 |
| 2002/0194470 A1 * | 12/2002 | Grupe ................. H04L 63/0428 713/153 |
| 2003/0076961 A1 | 4/2003 | Kim et al. |
| 2004/0255168 A1 * | 12/2004 | Murashita .......... G06K 9/00885 726/5 |
| 2005/0010767 A1 * | 1/2005 | Craft ..................... G06F 21/123 713/168 |

(Continued)

FOREIGN PATENT DOCUMENTS

| CN | 101552776 A | 10/2009 |
| CN | 102510330 A | 6/2012 |

(Continued)

*Primary Examiner* — Simon Kanaan
(74) *Attorney, Agent, or Firm* — Chip Law Group

(57) ABSTRACT

Various aspects of a method and system for digital rights management of encrypted digital content are disclosed herein. The method includes determination of a seed value from a pre-stored vault file that corresponds to a registered user. The determination of the seed value is based on biometric information provided by the registered user. The method further includes generation of a set of intermediate values based on the determined seed value. The generation of the set of intermediate values is based on a pre-determined rule. The method further includes determination of a content key based on the generated set of intermediate values.

21 Claims, 9 Drawing Sheets

(56) References Cited

U.S. PATENT DOCUMENTS

| | | | |
|---|---|---|---|
| 2008/0240426 A1* | 10/2008 | Gueron | G06F 12/0875 380/44 |
| 2009/0144546 A1* | 6/2009 | Jancula | H04L 63/0428 713/168 |
| 2009/0310779 A1 | 12/2009 | Lam et al. | |
| 2010/0138668 A1* | 6/2010 | Tsuria | G06F 21/32 713/186 |
| 2011/0231666 A1* | 9/2011 | Guenther | G06F 21/32 713/186 |
| 2012/0206236 A1 | 8/2012 | King | |
| 2014/0032924 A1 | 1/2014 | Durham et al. | |
| 2014/0095884 A1 | 4/2014 | Kannavara et al. | |
| 2015/0288681 A1* | 10/2015 | Park | H04L 63/0846 726/6 |
| 2015/0312041 A1* | 10/2015 | Choi | H04L 9/3231 713/175 |
| 2015/0378634 A1* | 12/2015 | Singh | G06F 3/0622 709/217 |
| 2016/0020899 A1* | 1/2016 | Kato | H04L 9/0816 380/28 |
| 2016/0105285 A1* | 4/2016 | Jakobsson | H04L 9/3231 713/186 |
| 2017/0063549 A1* | 3/2017 | Zwart | G07C 9/00087 |

FOREIGN PATENT DOCUMENTS

| | | |
|---|---|---|
| CN | 102946310 A | 2/2013 |
| EP | 1263164 A1 | 12/2002 |
| WO | 1999026372 A1 | 5/1999 |
| WO | 2008030184 A1 | 3/2008 |
| WO | 2008069475 A1 | 6/2008 |

\* cited by examiner

US 9,992,171 B2

METHOD AND SYSTEM FOR DIGITAL RIGHTS MANAGEMENT OF ENCRYPTED DIGITAL CONTENT

FIELD

Various embodiments of the disclosure relate to digital rights management of encrypted digital content. More specifically, various embodiments of the disclosure relate to digital rights management of encrypted digital content based on biometric information.

BACKGROUND

Recent advancements in the field of digital rights management have introduced various methods for protection of digital media content and devices after sale. In accordance with such methods, the digital media content may be protected based on one or more of the available cryptographic techniques. For example, with such an encryption of the digital media content, the user may use biometric information. Subsequently, to playback such encrypted digital media content, the user may request a third-party license server to acquire a valid license. The acquired valid license may comprise a content key that may be used to decrypt the encrypted digital media content for playback. In certain scenarios, the protected digital media content may be played back by only one user who has downloaded or purchased the digital media content. Further, if the biometric information is hacked, and/or stolen, the same biometric information cannot be used again, unlike a password. However, it may be desirable by the user to playback the encrypted digital media content on a random electronic device without the cumbersome mechanism of license acquisitions. It may be further desirable that the biometric information of the user used for cryptography is protected in a robust manner. Also, flexibility for a group of users to playback the encrypted digital content is more preferable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for digital rights management of encrypted digital content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
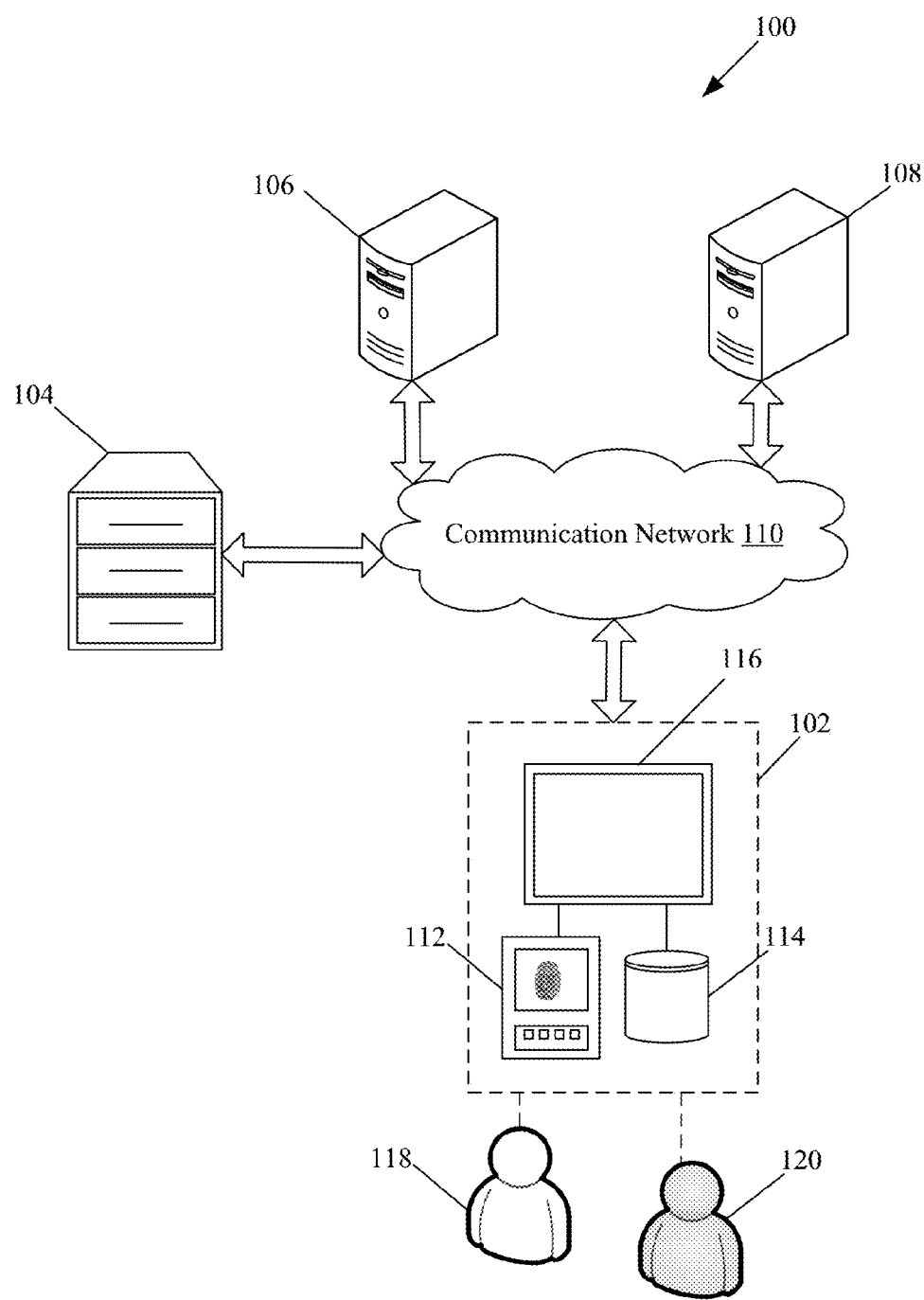
FIG. 1 is a block diagram that illustrates a network environment for digital rights management, in accordance with an embodiment of the disclosure.

Various implementations may be found in a method and a system for digital rights management of encrypted digital content. Exemplary aspects of the disclosure may comprise a method for digital rights management of encrypted digital content. The method may comprise determination of a seed value from a vault file. The determination may be based on biometric information provided by a registered user. The vault file may correspond to the registered user. A set of intermediate values may be generated based on the determined seed value and a pre-determined rule. A content key may be determined based on the generated set of intermediate values.

In accordance with an embodiment, the seed value may comprise one of a numeric string or an alpha-numeric string and may correspond to the encrypted digital content. In accordance with an embodiment, the encrypted digital content may be hosted on a content server associated with the electronic device. The vault file may comprise encrypted information to regenerate the seed value based on the biometric information provided by the registered user. The vault file may be generated when the user is registered and may be based on a fuzzy vault mechanism. The generated vault file may be stored in a file system associated with the electronic device.

In accordance with an embodiment, the seed value may be stored in a local memory for a current session. In accordance with an embodiment, an alpha-numeric array may be computed based on the seed value and usage of a pre-determined rule. A first pair of a set of intermediate values may be generated based on a selection of a pair of byte arrays with same size from the computed alpha-numeric array. In accordance with another embodiment, the first pair of set of intermediate values may be generated based on selection of a pair of byte arrays of different sizes from the computed alpha-numeric array. The selected pair of byte arrays may be overlapped to generate the first pair of byte arrays from the computed alpha-numeric array. In accordance with an embodiment, the selected pair of byte arrays may be combined to generate the first pair of byte arrays from the computed alpha-numeric array. In accordance with another embodiment, the selected pair of byte arrays may be multiplied with a pre-determined value to generate the first pair of byte arrays from the computed alpha-numeric array.

In accordance with an embodiment, a second pair of the set of intermediate values may be generated based on a determination of a prime number with respect to the selected first pair of the set of intermediate values. A pair of keys may be determined based on the generated set of intermediate values. In accordance with an embodiment, a new pair of keys may be generated based on a new seed value when the generated pair of keys is compromised.

In accordance with an embodiment, the stored seed value may be deleted when the pair of keys is determined. The pair of keys may comprise a public key and a private key. The private key may be stored in a local memory for a current session. The rights associated with the encrypted digital content may be acquired based on the private key. The rights may comprise a content key and/or a set of content playback rules. In accordance with an embodiment, the content key may be stored in the local memory for the current session. The encrypted digital content may be downloaded from a content server that hosts the encrypted digital content. The downloaded encrypted digital content may be decrypted based on the stored content key. The stored private key and the content key may be deleted after the decryption of the downloaded encrypted digital content.

Another exemplary aspect of the disclosure may comprise a method for user registration. A generated random number may be encrypted based on biometric information of one or more users. In accordance with an embodiment, the random number may be generated for a current session. Based on the encrypted random number, one or more vault files may be generated. The generated one or more vault files may correspond to one or more users.

In accordance with an embodiment, the one or more vault files may be generated based on a fuzzy vault mechanism and may be stored in a file system associated with the electronic device. The generated one or more vault files may comprise encrypted information to determine a seed value while an encrypted digital content is played back. In accordance with an embodiment, the vault files may not comprise biometric information of the one or more users.

In accordance with an embodiment, a vault file may be retrieved from the generated one or more vault files. A random number may be determined from the retrieved vault file based on biometric information provided by a registered user. The random number may be encrypted based on the biometric information provided by a new user. A new vault file that corresponds to the new user may be generated. The new user may be added to a group of registered users. The group of registered users may comprise the one or more users.

FIG. 1 is a block diagram that illustrates a network environment 100 for digital rights management, in accordance with an embodiment of the disclosure. With reference to FIG. 1, there is shown an electronic device 102, a non-secure file system 104, a rights acquisition server 106, a content server 108, and a communication network 110. The electronic device 102 may include a biometric scanner 112, a secure volatile memory 114, and/or a display screen 116. The electronic device 102 may be further associated with a user 118 and a new user 120. The electronic device 102 may be communicatively coupled to the non-secure file system 104, the rights acquisition server 106, and the content server 108, via the communication network 110.

The electronic device 102 may comprise suitable logic, circuitry, interfaces, and/or code that may be operable to receive biometric information associated with a user, such as the user 118, via the biometric scanner 112. Examples of the electronic device 102 may include, but are not limited to, a television, an Internet Protocol Television (IPTV), a laptop, a tablet computer, a smartphone, and/or a Personal Digital Assistant (PDA) device.

The non-secure file system 104 may comprise suitable logic, circuitry, interfaces, and/or code that may be operable to store one or more vault files that correspond to one or more registered users, such as the user 118. Examples of implementation of the non-secure file system 104 may include, but are not limited to, a disk file system, an optical disc, a flash file system, a tape file system, a database file system, a transactional file system, a network file system, audio-cassette storage, a flat file system, and/or a shared disk file system.

The rights acquisition server 106 may comprise suitable logic, circuitry, interfaces, and/or code that may be operable to determine one or more rights that correspond to the encrypted digital content based on a request generated by the electronic device 102. The rights may comprise a temporary content key and/or a set of content playback rules. When requested, the rights acquisition server 106 may be configured to transmit the one or more rights to the electronic device 102. Examples of the rights acquisition server 106 may include, but are not limited to, Apache™ HTTP Server, Microsoft® Internet Information Services (IIS), IBM® Application Server, Sun Java™ System Web Server, and/or a file server.

The content server 108 may comprise suitable logic, circuitry, interfaces, and/or code that may be operable to host encrypted digital content that may be played back at the electronic device 102. The content server 108 may be configured to transmit the encrypted digital content to the electronic device 102 when requested. Examples of the content server 108 may include, but are not limited to, Apache™ HTTP Server, Microsoft® Internet Information Services (IIS), IBM® Application Server, Sun Java™ System Web Server, and/or a file server.

The communication network 110 may include a medium through which the electronic device 102 may communicate with file systems. The file systems may include the non-secure file system 104 and one or more servers, such as the rights acquisition server 106, and/or the content server 108. Examples of the communication network 110 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The biometric scanner 112 may comprise suitable logic, circuitry, interfaces, and/or code that may be operable to receive the biometric information from the user 118. The biometric scanner 112 may comprise one or more sensors to confirm recognition, identification, and/or verification of the user 118. The one or more sensors may comprise a camera and/or capacitive-touch sensors to detect biometric information associated with the user 118. In accordance with an embodiment, the biometric scanner 112 may be integrated with the display screen 116. Examples of implementation of the biometric scanner 112 may include, but are not limited to, a fingerprint scanner, an iris scanner, a thermal radiation scanner, a retinal scanner, and/or the like.

The secure volatile memory 114 may comprise suitable logic, circuitry, interfaces, and/or code that may be operable to store temporary values generated for digital rights management of the encrypted digital content. The temporary values may comprise the seed value, the private key, and/or the content key that correspond to a current session associated with the user 118. In accordance with an embodiment, the secure volatile memory 114 may be integrated with the biometric scanner 112, and/or the display screen 116. Examples of the secure volatile memory 114 may include, but are not limited to, Static Random Access Memory (SRAM) and/or Dynamic Random Access Memory (DRAM).

The display screen 116 may comprise suitable logic, circuitry, interfaces, and/or code that may be operable to render decrypted content for the user 118. The display screen 116 may be further operable to render one or more features and/or applications of the electronic device 102. The display screen 116 may be further operable to receive an input from the one or more users, via a touch-sensitive screen. Such an input may be received from the one or more users by means of a virtual keypad, a stylus, a touch-based input, and/or a gesture. The display screen 116 may be realized through several known technologies such as, but not limited to, Liquid Crystal Display (LCD) display, Light Emitting Diode (LED) display, and/or Organic LED (OLED) display technology.

In operation, for registration, the electronic device 102 may be operable to receive biometric information associated with a group of users. The group of users may desire to playback a common encrypted digital content on a shared device, such as the electronic device 102. The group of users may include the user 118. The group of users may correspond to a specific domain, such as a group of family members, a group of friends, and/or other such social groups. The electronic device 102 may be operable to prompt the group of users to provide the biometric information. The prompt may be rendered on the display screen 116. The biometric information may be received from the group of users, via the biometric scanner 112. In accordance with an embodiment, the biometric information may comprise at least one of a fingerprint, palm geometry, a two-dimensional (2D) or three-dimensional (3D) facial profile, characteristic features of the iris, thermal radiation, vein matching and recognition and/or a retinal scan of the group of users. Notwithstanding, the disclosure may not be so limited, other such biometric information may be received from the group of users, without limiting the scope of the disclosure.

In accordance with an embodiment, for registration, a pseudo-random number generator (not shown) in the electronic device 102 may be operable to generate a random number for a current session. The generated random number may be a unique key that may comprise a numeric string and/or an alpha-numeric string. The electronic device 102 may encrypt the random number based on the biometric information received from the group of users, via the biometric scanner 112. The electronic device 102 may be operable to generate one or more vault files based on a fuzzy vault encoding mechanism, which is known in the art. The electronic device 102 may be operable to store the generated one or more vault files in the non-secure file system 104. The generated one or more vault files may be used to complete the registration of the user 118. The generated random number may not be available in the non-secure file system 104, the secure volatile memory, or other such memory associated with the electronic device 102.

In accordance with an embodiment, one of the users from the registered group of users, such as the registered user 118, may desire to playback the common encrypted digital content at the electronic device 102. The electronic device 102 may be operable to retrieve a vault file that corresponds to the registered user 118. In such an embodiment, the vault file may be automatically retrieved based on identification, such as facial recognition of the registered user 118. The vault file may be manually retrieved by the registered user 118 from the non-secure file system 104. The registered user 118 may further provide biometric information, such as fingerprints, to the electronic device 102, via the biometric scanner 112.

In accordance with an embodiment, based on the biometric information, the electronic device 102 may be operable to determine a seed value from the vault file. The determined seed value may correspond to the random number, which may be generated at the time of registration of the user 118.

The electronic device 102 may be operable to store the determined seed value in the secure volatile memory 114. In accordance with an embodiment, the seed value may be stored in the secure volatile memory 114 for the current session that corresponds to the user 118. In accordance with an embodiment, the seed value may comprise a numeric string or an alpha-numeric string.

The electronic device 102 may be operable to compute an alpha-numeric array from the determined seed value based on a pre-determined rule. In accordance with an embodiment, the pre-determined rule may comprise a one-way function, such as a hash function. The pre-determined rule may be such that the seed value may not be re-generated based on the computed alpha-numeric array. In accordance with an embodiment, the computed alpha-numeric array may comprise a numeric string or an alpha-numeric string.

The electronic device 102 may be further operable to generate a set of intermediate values based on the computed alpha-numeric array. In accordance with an embodiment, the generation of the set of intermediate values may be implemented via the pre-configured criterion. The set of intermediate values may comprise a first pair of set of intermediate values and/or a second pair of set of intermediate values. The first pair of set of intermediate values may comprise, selection of a pair of byte arrays of different sizes from the computed alpha-numeric array. The first pair of set of intermediate values may further comprise selection of a pair of byte arrays of same size from the computed alpha-numeric array. The first pair of set of intermediate values may also comprise superimposition of the selected pair of byte arrays from the computed alpha-numeric array or a combination of selected pair of byte arrays with a pre-determined byte from the computed alpha-numeric array. In accordance with another embodiment, the first pair of set of intermediate values may comprise multiplication of the selected pair of byte arrays with a pre-determined numeric value from the computed alpha-numeric array. The second pair of set of intermediate values may be generated based on a selection of a nearest prime number with respect to the selected first pair of set of intermediate values.

In accordance with an embodiment, the pair of keys may be determined based on the generated second pair of the set of intermediate values. In accordance with an embodiment, the pair of keys may be determined based on the Ron Rivest, Adi Shamir, and Leonard Adleman (RSA) key pair generation mechanism. The determined pair of keys may comprise a public key and a private key. The private key may be stored in the secure volatile memory 114 for the current session associated with the user 118. The electronic device 102 may delete the stored private key once the current session is over.

In accordance with an embodiment, the user 118 may desire to playback the encrypted digital content at a remote electronic device, such that the remote electronic device may not be associated with another biometric scanner similar to the biometric scanner 112. In such a case, the electronic device 102 may be operable to share the determined pair of keys with the remote electronic device. In such a case, a secure connection may be established between the electronic device 102 and the remote electronic device, based on a secure exchange protocol, such as a secure sockets layer (SSL).

In accordance with an embodiment, the electronic device 102 may be operable to retrieve the one or more rights associated with the encrypted digital content based on the stored private key. In such a case, the electronic device 102 may establish a secure connection with the rights acquisition server 106. In accordance with an embodiment, the electronic device 102 may transmit the public key to the rights acquisition server 106, via the secure connection. The electronic device 102 may acquire one or more rights bound to the private key that may correspond to the user 118. The acquired one or more rights may comprise the content key and/or the set of playback rules. In accordance with an embodiment, the electronic device 102 may store the acquired content key in the secure volatile memory 114 for the current session that corresponds to the user 118.

In accordance with an embodiment, the electronic device 102 may determine the content key based on the acquired one or more rights. In accordance with an embodiment, the electronic device 102 may be further operable to store the content key in the secure volatile memory 114. In accordance with an embodiment, the electronic device 102 may be operable to download the encrypted digital content from the content server 108 after the acquisition of the one or more rights associated with the encrypted digital content. The electronic device 102 may be further operable to decrypt the downloaded encrypted digital content based on the stored content key. In accordance with an embodiment, the method used to decrypt may correspond to the method used to encrypt the content. The electronic device 102 may be further operable to delete the stored content key after the decryption of the encrypted digital content. The electronic device 102 may be further operable to play the decrypted content on the display screen 116 based on the acquired set of playback rules.

In accordance with an embodiment, the new user 120 may be registered with the electronic device 102. The new user 120 may be registered in association with one of the group of users, such as the user 118. In such a case, for registration, the electronic device 102 may be operable to receive new biometric information associated with the new user 120.

In accordance with an embodiment, the electronic device 102 may be operable to receive the vault file that corresponds to the registered user 118. The vault file may be retrieved based on the identification, such as facial recognition, of the registered user 118. The registered user 118 may further provide biometric information, such as fingerprints, to the electronic device 102, via the biometric scanner 112. Based on the biometric information, the electronic device 102 may be operable to retrieve a seed value from the vault file. The determined seed value may correspond to the random number generated at the time of registration of the user 118.

In accordance with an embodiment, the electronic device 102 may encrypt the retrieved random number based on the biometric information received from the new user 120, via the biometric scanner 112. The electronic device 102 may be operable to generate a new vault file based on the fuzzy vault encoding mechanism, which is known in the art. In accordance with an embodiment, to complete the registration of the new user 120, the electronic device 102 may be operable to store the generated new vault file in the non-secure file system 104. The generated random number may not be available in the non-secure file system 104, the secure volatile memory, and/or other such memory associated with the electronic device 102. The new user 120, when registered, may be added to the group of users.

In accordance with an embodiment, the electronic device 102 may be operable to cancel the pair of keys associated with the group of users. The cancellation of the pair of keys may be performed when the generated pair of keys is compromised. In one instance, the generated pair of keys may be compromised due to a plurality of events, such as when the electronic device 102 is hacked or stolen, and/or the electronic device 102 is not operational due to a technical fault. In such a case, the electronic device 102 may be operable to generate a new seed value. In accordance with an embodiment, the electronic device 102 may be further operable to generate the new key pair based on the new seed value and the biometric information of each of the registered users from the group of users.

Figure 2:
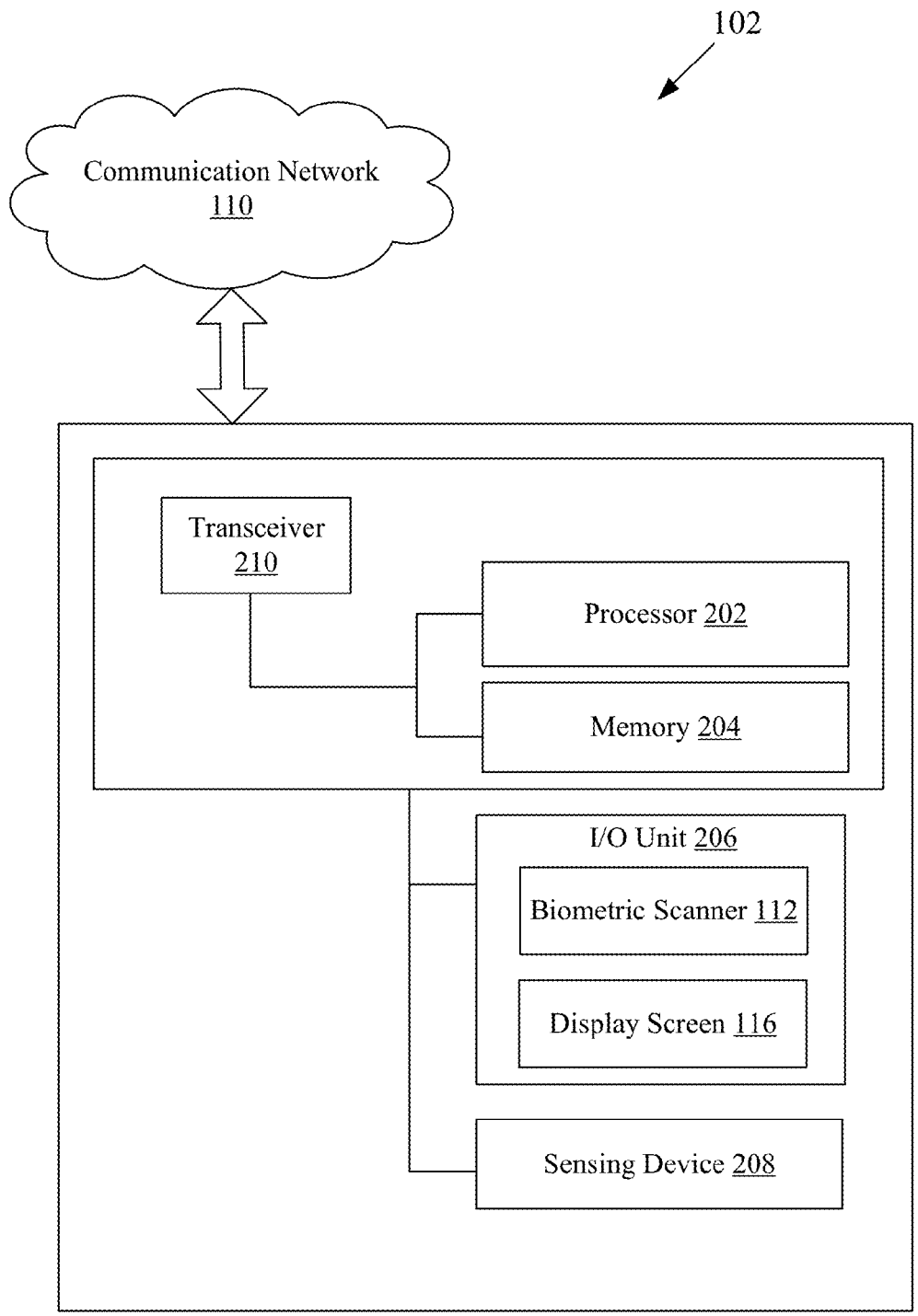
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown an electronic device 102. The electronic device 102 may comprise one or more processors, such as a processor 202. The electronic device 102 may further comprise a memory 204, and one or more input/output (I/O) devices, such as an I/O unit 206. The electronic device 102 may further comprise one or more sensing units, such as the sensing unit 208, and a transceiver 210. The processor 202 may be communicatively coupled to the memory 204, the I/O unit 206, the sensing unit 208, and the transceiver 210.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the processor 202. The memory 204 may further comprise the secure volatile memory 114 (FIG. 1). The memory 204 may be operable to store the predetermined rule to determine the alpha-numeric array based on the retrieved seed value. The memory 204 may be further operable to store the one or more pre-configured criterion used to generate a first pair and a second pair of set of intermediate values. The secure volatile memory 114 may be operable to store temporary values generated for digital rights management of the encrypted digital content. The temporary values may comprise the seed value, the private key, and/or the content key received with the acquired one or more rights. Examples of implementation of the memory 204 may include, but are not limited to, Random Access Memory (RAM), Read Only Memory (ROM), Hard Disk Drive (HDD), and/or a Secure Digital (SD) card.

The I/O unit 206 may comprise suitable logic, circuitry, interfaces, and/or code that may be operable to receive one or more input from a user and/or provide one or more output to the user. The I/O unit 206 may comprise various input and output devices, such as the biometric scanner 112 (FIG. 1), which may be operable to communicate with the processor 202. The biometric scanner may be operable to scan the biometric information provided by the user. Examples of the biometric scanner may include, but are not limited to, a camera and/or a capacitive-touch sensor used to detect the biometric information. Examples of the I/O unit 206 may include, but are not limited to, a touch screen, a touch pad, and/or a microphone.

The sensing unit 208 may comprise suitable logic, circuitry, and/or interfaces that may be operable to detect biometric information based on one or more biometric characteristics associated with each user of the group of users. The sensing unit 208 may comprise one or more sensors to confirm recognition, identification, and/or verification of the user 118. The sensing unit 208 may be operable to receive the biometric information via the biometric scanner 112. The sensing unit 208 may be implemented based on several technologies that are well known to those skilled in the art.

The transceiver 210 may comprise suitable logic, circuitry, interfaces, and/or code that may be operable to communicate with the other servers, via the communication network 110. The transceiver 210 may implement known technologies to support wired or wireless communication of the electronic device 102 with the communication network 110. The transceiver 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as a Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to receive the biometric information (FIG. 1) associated with the group of users. The group of users may include the user 118. In accordance with an embodiment, the biometric scanner 112 may be operable to scan the biometric information associated with the group of users. The biometric scanner 112 may be further operable to communicate the scanned biometric information to the sensing unit 208. The biometric scanner 112 may be operable store the scanned biometric information for the current session, in the memory 204. The sensing unit 208 may be operable retrieve a pattern associated with the biometric information from the memory 204. The sensing unit 208 may be further operable to compare the scanned biometric information with the retrieved pattern.

In accordance with an embodiment, when the comparison is unsuccessful, the processor 202 may be operable to prompt the user 118 to register via the I/O unit 206, based on the provided biometric information. The I/O unit 206 may be operable to retrieve the response of the user 118, based on the prompt. In such a case, the processor 202 may be operable to register the user 118 based on the response received by the I/O unit 206. The processor 202 may be operable to abandon the current session based on the response received by the I/O unit 206.

In accordance with an embodiment, the pseudo-random number generator (not shown) in the electronic device 102 may be operable to generate a random number "R", in response to the input provided by the user 118 for registration. In accordance with an embodiment, the processor 202 may be operable to encrypt the random number "R", with the biometric information that corresponds to the user 118. The processor 202 may be further operable to generate a vault file "VA" that corresponds to the user 118. The generation of the vault file "VA", may be based on the fuzzy vault mechanism. The processor 202 may be further operable to transmit the vault file "VA", to the non-secure file system 104 for storage, via the transceiver 210.

In accordance with an embodiment, when the comparison is successful, the sensing unit 208 may be operable to confirm the identity of the user 118. In such a case, the sensing unit 208 may communicate the result of the successful comparison to the processor 202. The biometric information provided by the user 118 may be used to download and decrypt the encrypted digital content stored at the content server 108 (FIG. 1). The processor 202 may be operable to retrieve the vault file "VA", associated with the user 118. In accordance with an embodiment, the transceiver 210 may be operable to receive the vault file "VA", from the non-secure file system 104. The transceiver 210 may be further operable to communicate the vault file "VA", to the processor 202. The processor 202 may be operable to determine a seed value from the retrieved vault file "VA". The processor 202 may be operable to retrieve a code section from the memory 204 to decrypt the seed value stored in the vault file "VA". The decrypted seed value may correspond to the random number "R", generated at the time of registration of the user 118. In accordance with an embodiment, the processor 202 may be operable to store the determined seed value "R", in the memory 204 for the current session.

In accordance with an embodiment, the processor may be operable to retrieve a pre-determined rule, such as a one-way function from the memory 204. The processor 202 may be further operable to compute an alpha-numeric array "A", based on the seed value based on the pre-determined rule. The computed alpha-numeric array "A", may comprise a numeric string or an alpha-numeric string. In accordance with an embodiment, the processor 202 may be further operable to generate a set of intermediate values such as "$P_1$", "$Q_1$", "P", and "Q", based on the alpha-numeric array "A". The processor 202 may be operable to generate the first pair of set of intermediate values "$P_1$" and "$Q_1$", and/or the second pair of set of intermediate values "P" and "Q", based on a pre-configured criterion. In accordance with an embodiment, the processor 202 may be further operable to retrieve the pre-configured criterion from the memory 204.

In accordance with an embodiment, the processor 202 may be operable to select a first set of characters from the alpha-numeric array "A". The selected first set of characters may be combined in a sequence to generate the first value, such as "$P_1$", of the first pair. The generated first value "$P_1$", may be a number. The processor 202 may be further operable to generate a first value, such as "P", of the second pair, based on selection of a prime number nearest to the generated first value "$P_1$". The processor 202 may be operable to select a second set of characters from the alpha-numeric array "A". The selected characters may be combined in a sequence to generate the second value, such as "$Q_1$", of the first pair. The generated second value "$Q_1$", may be a number. The processor 202 may be further operable to generate a second value, such as "Q", of the second pair, based on selection of a prime number nearest to the generated second value "$Q_1$".

In accordance with an embodiment, the processor 202 may be further operable to retrieve the RSA key pair generation mechanism from the memory 204. The processor 202 may be further operable to determine a public key and a private key, based on the RSA key pair generation mechanism. The determined public key and the private key may correspond to the temporary pair of keys. The processor 202 may be further operable to store the determined private key in the secure volatile memory 114. In accordance with an embodiment, the processor 202 may be further operable to delete the stored seed value from the secure volatile memory 114 once the temporary pair of keys is determined.

In accordance with an embodiment, the processor 202 may be operable to cancel the pair of keys associated with the group of users that includes the user 118. The cancellation of the pair of keys may be performed when the generated pair of keys is compromised. The generated pair of keys may be compromised due to a plurality of events, such as the electronic device 102 is hacked or stolen, and/or the electronic device 102 is not operational due to a technical fault. In such a case, the processor 202 may be operable to generate a new seed value. In accordance with an embodiment, the processor 202 may be further operable to generate the new key pair based on the new seed value and the biometric information of each of the registered users from the group of users.

In accordance with an embodiment, the processor 202 may be operable to acquire one or more rights associated with the encrypted digital content from the rights acquisition server 106. The one or more rights may be acquired based on the private key. The transceiver 210 may be operable to establish a secure connection with the rights acquisition server 106, via the communication network 110. The secure connection may be established based on a protocol that may comprise a secure sockets layer (SSL) or a transport layer security (TLS). The processor 202 may be operable to communicate the public key to the rights acquisition server 106, via the transceiver 210. In accordance with an embodiment, the transceiver 210 may be operable to receive the one or more rights from the rights acquisition server 106, via the communication network 110. The one or more rights may comprise content key, such as "CK", and/or a set of playback rules that may correspond to the encrypted digital content. The processor 202 may be operable to store the content key "CK", in the secure volatile memory 114.

In accordance with an embodiment, the processor 202 may be operable to download the encrypted digital content from the content server 108. The transceiver 210 may be operable to receive the encrypted digital content from the content server 108. The transceiver 210 may be further operable to communicate the encrypted digital content to the processor 202. The processor 202 may be operable to retrieve a code section from the memory 204 to decrypt the downloaded encrypted digital content. The processor 202 may be further operable to decrypt the downloaded encrypted digital content based on the content key "CK". The processor 202 may be further operable to delete the private key and the content key "CK", from the secure volatile memory 114, once the encrypted digital content is decrypted.

In accordance with an embodiment, the processor 202 may be operable to communicate the decrypted content to the I/O unit 206. The I/O unit 206 may retrieve a playback component from the memory 204 to render the decrypted content on the display screen 116. Notwithstanding, the disclosure may not be so limited, and the processor 202 may be operable to the retrieve the playback component from a remote location, without limiting the scope of the disclosure.

In accordance with an embodiment, the new user 120 may desire to register with respect to the group of users that includes the user 118, and playback the common encrypted digital content on a shared device, such as the electronic device 102. In such a case, for registration, the processor 202 may be operable to receive new biometric information associated with the new user 120, via the biometric scanner 112.

In accordance with an embodiment, the processor 202 may be operable to retrieve the vault file that corresponds to the registered user 118 from the non-secure file system 104, via the transceiver 210. The processor 202 may be operable to retrieve the vault file based on the identification, such as facial recognition, of the registered user 118. In accordance with an embodiment, the processor 202 may be further operable to receive the biometric information, such as fingerprints, of the registered user 118, via the biometric scanner 112. Based on the biometric information of the registered user 118, the processor 202 may be operable to retrieve a seed value from the retrieved vault file. The determined seed value may correspond to the random number generated at the time of registration of the user 118.

In accordance with an embodiment, the processor 202 may encrypt the retrieved random number based on the biometric information of the new user 120, received via the biometric scanner 112. The processor 202 may be operable to generate a new vault file based on a fuzzy vault encoding mechanism, which is known in the art. To complete the registration of the new user 120, the processor 202 may be further operable to store the generated new vault file in the non-secure file system 104. In accordance with an embodiment, the generated random number may not be available in the non-secure file system 104, the secure volatile memory, and/or other such memory associated with the electronic device 102. The new user 120, when registered, may be added to the group of users.

Figure 3A:
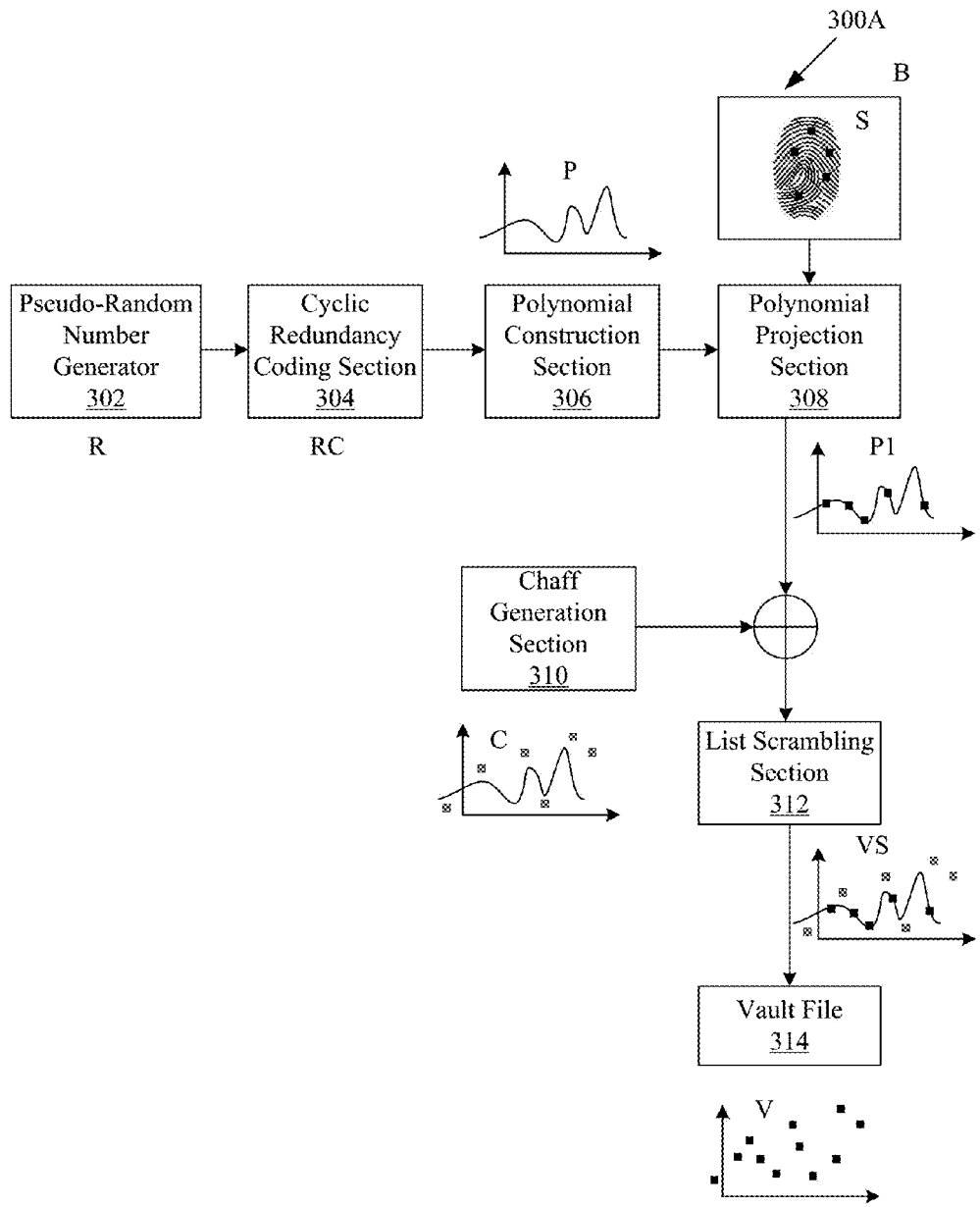
FIGS. 3A and 3B illustrate fuzzy vault encoding and decoding mechanisms to implement the disclosed method and system for digital rights management, in connection with an embodiment of the disclosure.
Figure 3B:
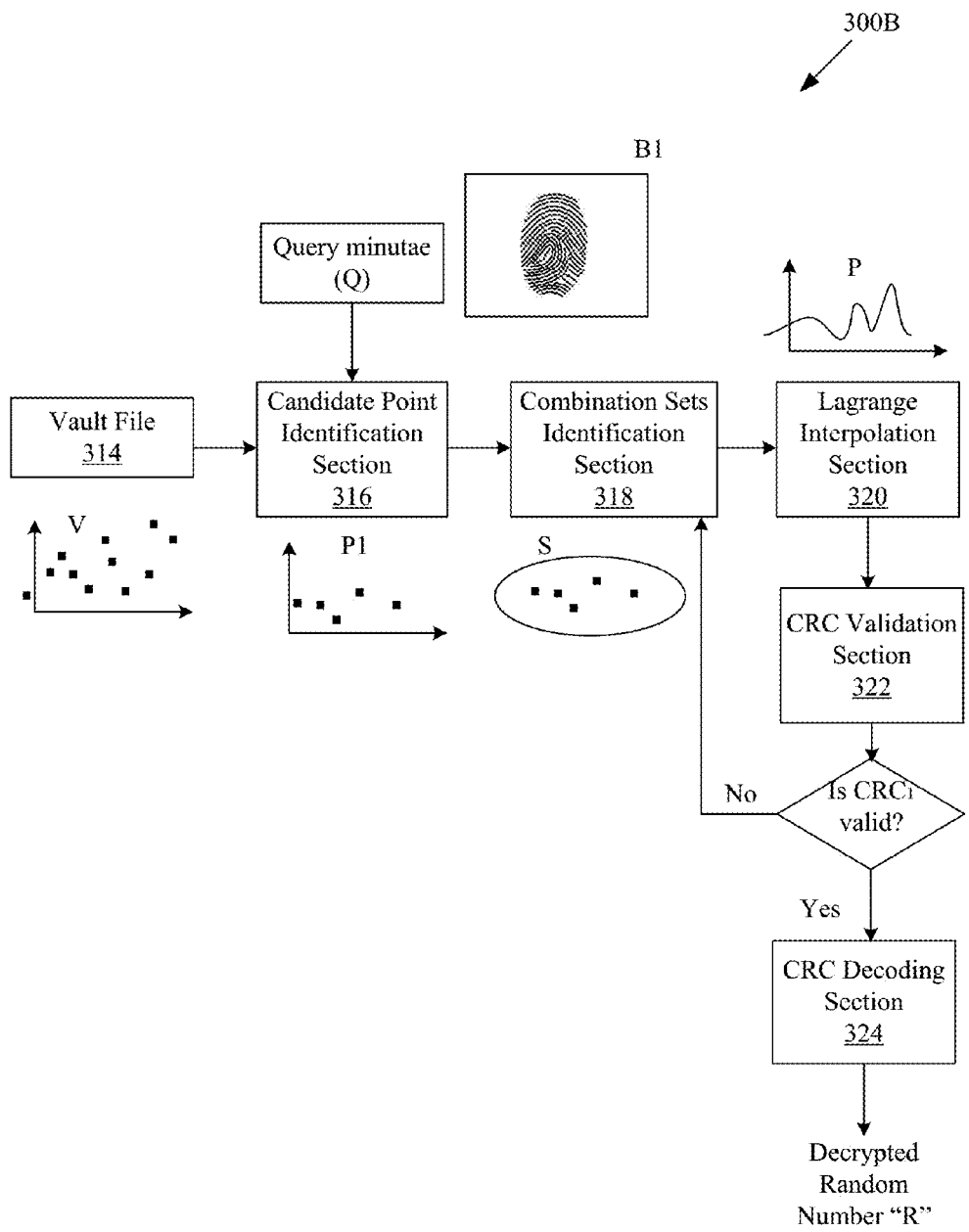

FIGS. 3A and 3B illustrate fuzzy vault encoding and decoding mechanisms to implement the disclosed method and system for digital rights management, in connection with an embodiment of the disclosure. FIGS. 3A and 3B are explained in conjunction with elements from FIGS. 1 and 2.

With reference to FIG. 3A, a fuzzy vault encoding mechanism 300A is illustrated. There is shown a pseudo-random number generator 302, a cyclic redundancy coding (CRC) section 304, a polynomial construction section 306, a polynomial projection section 308, a chaff generation section 310, a list scrambling section 312, and a vault file 314. The functionality of the above-mentioned processing components may be known in the art, without deviation from the scope of the disclosure. In accordance with an embodiment, the processor 202 may comprise the above-mentioned processing components.

With reference to FIG. 3A, the processor 202 may be operable to generate a vault file for registration of a user, such as user 118. In accordance with an embodiment, the pseudo-random number generator may be operable to generate the random number 302, such as "55541321", for example. The CRC section 304 may encrypt the random number "R", based on a cyclic redundancy code. The encrypted value may be "RC", such as "66652432", for example. In accordance with an embodiment, the polynomial construction section 306 may construct a polynomial, such as a polynomial "P", based on the encrypted value "RC".

In accordance with an embodiment, the polynomial construction section 306 may map the polynomial "P", with a set of points "S", associated with the biometric information provided by the user 118. The set of points "S", may pass through the polynomial "P". The polynomial projection section 308 may generate a polynomial, such as "P₁", based on the set of points "S", and the polynomial "P". In accordance with an embodiment, the chaff generation section 310 may further generate some chaff points, such as chaff points "C". The chaff points "C", may be derived based on the biometric information provided by the user 118. The derived chaff points may be those points that do not pass through the generated polynomial "P". In accordance with an embodiment, the chaff points "C", and the polynomial "P₁", may be combined to generate the vault, such as the vault "VS". In accordance with an embodiment, the vault "VS", may contain the set of points "S", and the chaff points "C", distributed over the polynomial "P". In accordance with an embodiment, the list scrambling section 312 may further scramble the set of points "S", and chaff points "C", which correspond to the vault "VS", to generate the vault file 314, such as the vault file "V". In accordance with an embodiment, the vault file "V", may comprise the associated set of points and may be stored in the non-secure file system 104.

With reference to FIG. 3B, a fuzzy vault decoding mechanism 300B is illustrated. There is shown a candidate point identification section 316, a combination sets identification section 318, a Lagrange interpolation section 320, a CRC validation section 322, and a CRC decoding section 324. The functionality of the above-mentioned processing components may be known in the art, without deviation from the scope of the disclosure.

With reference to FIG. 3B, the decryption of the random number based on the vault file 314 may be performed based on the biometric information, such as "B₁", provided by the user 118, at the time of playback of the encrypted content. In accordance with an embodiment, the decryption may involve regeneration of the polynomial "P", in order to retrieve the random number "R". In accordance with an embodiment, the candidate point identification section 316 may use the vault file 314 with associated set of points "S", and the biometric information "B₁", to separate the set of points "S", from the chaff points "C". When the biometric information "B₁", does not correspond to the biometric information "B", the candidate point identification section 316 may not be able to separate the set of points "S", from the chaff points "C", present in the vault file 314. Such biometric information may be termed as invalid biometric information.

In accordance with an embodiment, when the biometric information "B₁", corresponds to the biometric information of the user 118, the candidate point identification section 316 may successfully separate the set of points "5", from the chaff points "C". In accordance with an embodiment, the combination sets identification section 318 may combine the one or more separated set of points. In accordance with an embodiment, the Lagrange interpolation section 320 may interpolate the combined one or more separated set of points to generate the polynomial, such as the polynomial "P". The CRC validation section 322 may determine the validity of an available cyclic redundancy code, such as "CRC₁". In an instance where the available cyclic redundancy code "CRC₁", is invalid, the combination sets identification section 318 may combine another one or more separated set of points. In an instance where the available cyclic redundancy code "CRC₁", is valid, the CRC decoding section 324 may decrypt the random number "R", based on the available cyclic redundancy code "CRC₁".

Figure 4:
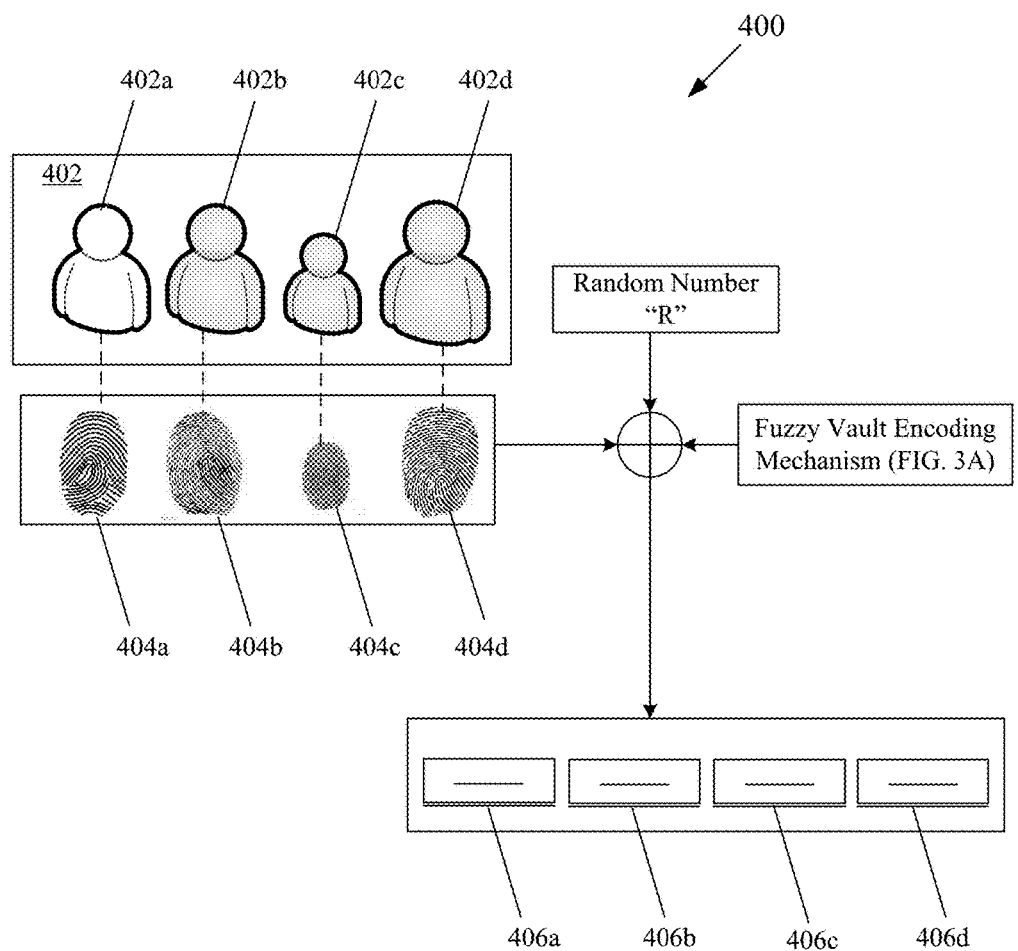
FIG. 4 illustrates a first exemplary scenario to implement the disclosed method and system for digital rights management, in accordance with an embodiment of the disclosure.

FIG. 4 illustrates a first exemplary scenario to implement the disclosed method and system for digital rights management of encrypted digital content, in accordance with an embodiment of the disclosure. FIG. 4 is explained in conjunction with elements from FIGS. 1, 2, and 3. With reference to FIG. 4, there is shown an exemplary scenario 400 for registration of a group of users. The group of users may include users 402a, 402b, 402c, and 402d. The users 402a to 402d may be similar to the user 118 (FIG. 1). The group of users may be grouped based on a pre-specified domain 402, such as a group of family members. The group of users may provide biometric information, such as the biometric information 404a, 404b, 404c, and/or 404d, to the electronic device 102, simultaneously. The biometric information 404a, 404b, 404c, and/or 404d may correspond to the users 402a, 402b, 402c, and 402d, respectively. The biometric information may be provided by the users 402a, 402b, 402c, and 402d, via the biometric scanner 112 (FIG. 1). Vault files 406a, 406b, 406c, and 406d may correspond to the users 402a, 402b, 402c, and 402d, respectively.

With reference to FIG. 4, the biometric information that may correspond to the group of users may be detected by biometric scanner 112. In accordance with an embodiment, the pseudo-random number generator 302 (FIG. 3A) may generate a random number "R", with a value "55541321", for example. In accordance with an embodiment, the processor 202 may store the random number "R", in the secure volatile memory 114 (FIG. 1). The biometric information 404a to 404d may be used to encrypt the random number "R". The processor 202 may use a different encryption algorithm for each of the users associated with the pre-specified domain 402. For example, with respect to the user 402a, the processor 202 may encrypt the random number "R", based on an increment of each digit of the random number "R", by a value, such as "1". As a result of such an encryption algorithm, the generated value that corresponds to the user 402a may be "66652432", for example. For the user 402b, the processor 202 may encrypt the key "R", based on an increment of each digit of the random number "R", by a value, such as "2". As a result of such an encryption algorithm, the generated value that corresponds to the user 402b may be "77763543", for example. Similarly, the processor 202 may further encrypt the random number "R", with the biometric information associated with the users 402c and 402d, based on the different encryption algorithms. The encrypted value of random number that corresponds to the users 402c and 402d may be "88874654", and "99985765", respectively. In accordance with an embodiment, the processor 202 may generate a vault file for each of the group of users based on the fuzzy vault encoding mechanism, as described previously in FIG. 3A.

The encrypted values "66652432", "77763543", "88874654", and "99985765", may be locked in vault files 406a, 406b, 406c, and 406d, respectively, for example. The vault files 406a, 406b, 406c, and 406d may correspond to the users 402a, 402b, 402c, and 402d, respectively. In accordance with an embodiment, the processor 202 may store the vault files 406a, 406b, 406c, and 406d in the non-secure file system 104. The processor 202 may delete the random number "R", from the memory 204 once the vault files 406a, 406b, 406c, and 406d are generated.

Figure 5:
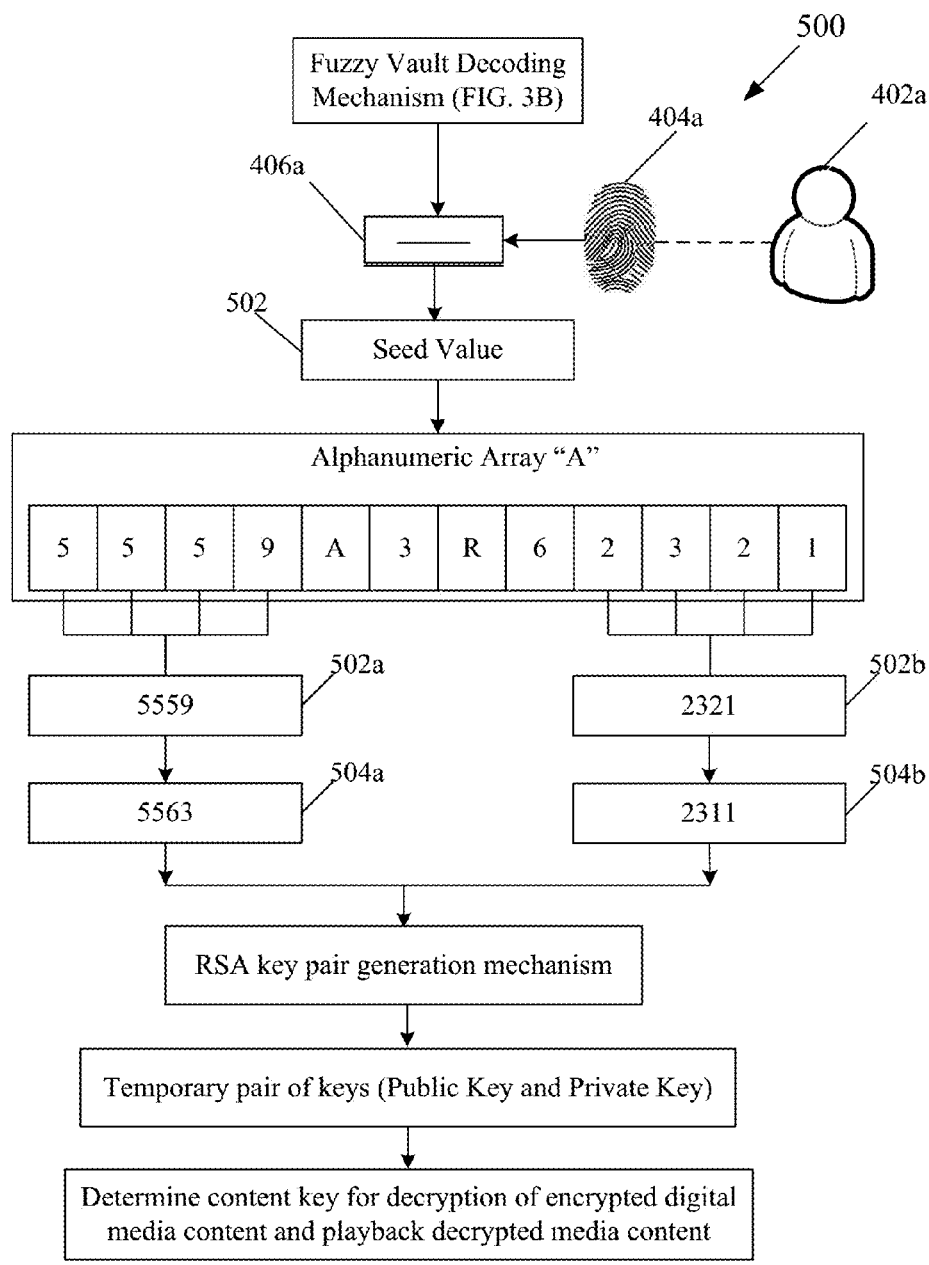
FIG. 5 illustrates a second exemplary scenario to implement the disclosed method and system for digital rights management, in accordance with an embodiment of the disclosure.

FIG. 5 illustrates a second exemplary scenario to implement the disclosed method and system for digital rights management of encrypted digital content, in accordance with an embodiment of the disclosure. FIG. 5 is explained in conjunction with elements from FIGS. 1, 2, 3, and 4. With reference to FIG. 5, there is shown an exemplary scenario 500 to decrypt the encrypted digital content. The encrypted digital content may be hosted by the content server 108 (FIG. 1).

With reference to FIG. 5, the user 402a (FIG. 4) may provide the biometric information 404a (FIG. 4) to decrypt the encrypted digital content. In accordance with an embodiment, the processor 202 may retrieve the vault file 406a from the non-secure file system 104. The processor 202 may determine the seed value from the vault file 406a, based on the biometric information 404a provided by the user 402a. The seed value may correspond to the random number "R", with the value "55541321", for example. In accordance with an embodiment, the determination of the seed value may be based on the decryption based on fuzzy vault decoding mechanism, as illustrated previously in FIG. 3B. The processor 202 may store the seed value in the secure volatile memory 114.

In accordance with an embodiment, the processor 202 may compute the alpha-numeric array "A" (FIG. 2), based on the pre-determined rule. The alpha-numeric array "A", may be a numeric string with a value "5559A3R62321", for example. The processor 202 may compute a first value 502a, such as "$P_1$", and a second value 502b, such as "$Q_1$", of the first pair of the set of intermediate values. The processor 202 may compute the first value 502a and the second value 502b based on the alpha-numeric array "A". The generation of the first pair of the set of intermediate values may be based on a pre-configured criterion stored in the memory 204. The pre-configured criterion may include selection of a pre-determined number of characters from the alpha-numeric array "A". For example, the processor 202 may select first four characters from the alpha-numeric array "A", to compute the first value "$P_1$", such as "5559", for example. In accordance with an embodiment, the processor 202 may further select the last four characters from the alpha-numeric array "A", to generate the second value "$Q_1$", such as "2321", for example. In another example, the first value 502a may be determined based on a selection of last five characters and the second value 502b may be determined based on a selection of first four characters from the alpha-numeric array "A". Notwithstanding, the disclosure may not be so limited and other pre-configured criteria may be used to generate the first pair of the set of intermediate values, without deviating from the scope of the disclosure.

In accordance with an embodiment, the processor 202 may compute a first value 504a, such as "P", and a second value 504b, such as "Q", of the second pair of the set of intermediate values. The processor 202 may compute the first value 504a and the second value 504b of the second pair of the set of intermediate values based on the first pair of the set of intermediate values. In accordance with an embodiment, the generation of the second pair of the set of intermediate values may be based on the pre-configured criterion stored in the memory 204. The pre-configured criterion may comprise determination of a prime number nearest to the first value 502a and the second value 502b. For example, the prime numbers "5563", and "2311", may correspond to the second pair of the set of intermediate values. The second pair of the set of intermediate values may be generated by a method that may include multiplication of the first value 502a and the second value 502b, with a pre-determined numeric value. Notwithstanding, the disclosure may not be so limited and other pre-configured criteria may be used to generate the second pair of the set of intermediate values, without deviating from the scope of the disclosure.

In accordance with an embodiment, the processor 202 may further determine a temporary pair of keys based on the generated second pair of set of intermediate values. In accordance with an embodiment, the determination of temporary pair of keys may be based on RSA key pair generation mechanism, which is known in the art. The temporary pair of keys may comprise a public key and a private key. The RSA key pair generation mechanism comprises computation of a number, such as "N", based on a pair of values. The pair of values may be the second pair, such as "P", and "Q", of the set of intermediate values, in accordance with equation (1).

$$N=P*Q \qquad (1)$$

In accordance with an embodiment, the processor 202 may compute Euler's Totient function, such as "$\varphi(n)$", based on the computed values "N", "P", and "Q", in accordance with equation (2).

$$\varphi(n)=N-(P+Q-1) \qquad (2)$$

In accordance with another embodiment, the processor 202 may further select an integer, such as "e". In accordance with an embodiment, the value of "e" may be selected such that "e", and the function "$\varphi(n)$", are co-prime. The value of "e", may be further based on equation (3).

$$1<e<\varphi(n) \qquad (3)$$

In accordance with another embodiment, the pair of computed values "N", and "e", may correspond to the public key. The processor 202 may further compute a value, such as "d", in accordance with equation (4).

$$d=e^{-1}(\mod(\varphi(n))) \qquad (4)$$

where "d", may be the private key, and "d", is the multiplicative inverse of "e $(\mod(\varphi(n)))$".

In accordance with an embodiment, the processor 202 may store the private key "d", in the secure volatile memory 114. The private key may further be used for playback of an encrypted digital content, as explained in FIGS. 1 and 2.

Figure 6:
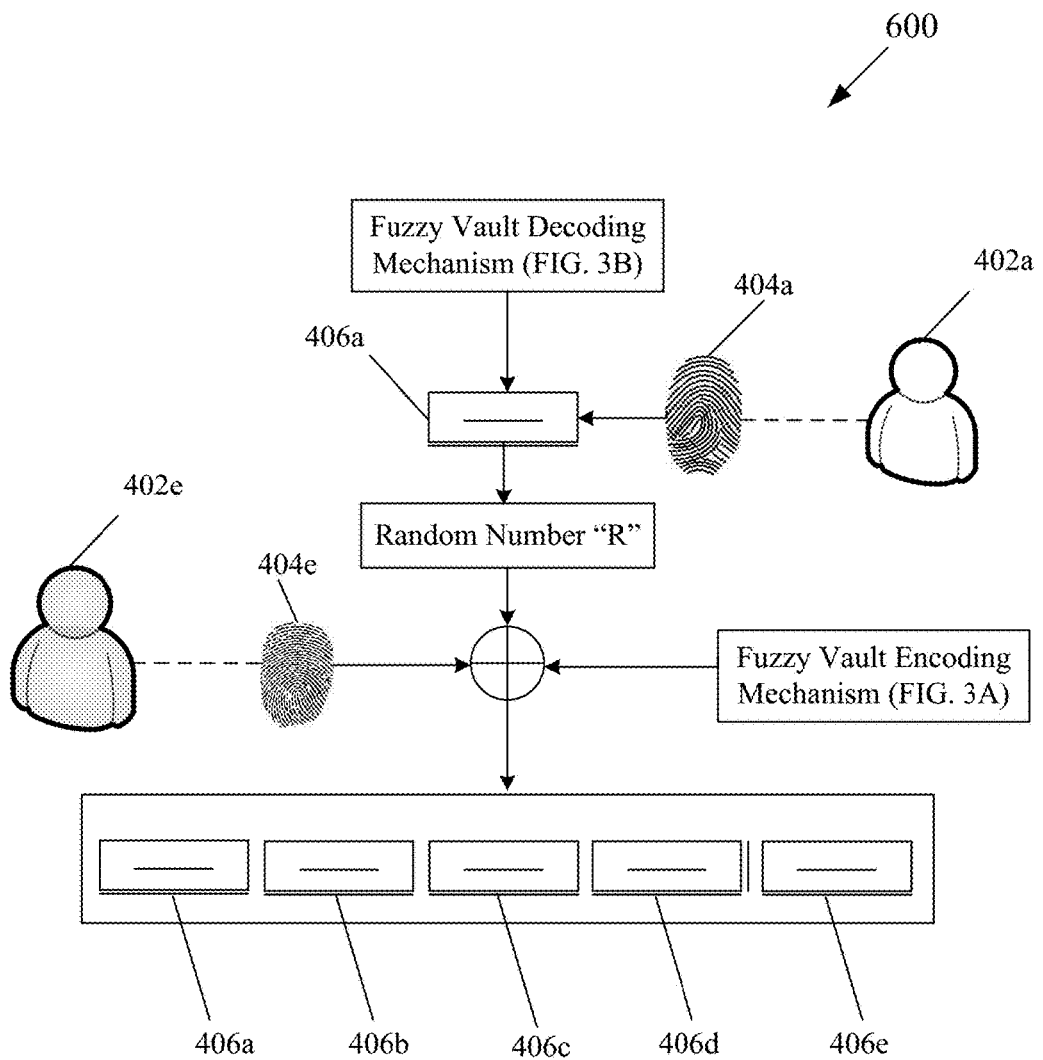
FIG. 6 illustrates a third exemplary scenario to implement the disclosed method and system for digital rights management, in accordance with an embodiment of the disclosure.

FIG. 6 illustrates a third exemplary scenario to implement the disclosed method and system for digital rights management of encrypted digital content, in accordance with an embodiment of the disclosure. FIG. 6 is explained in conjunction with elements from FIGS. 1, 2, 3, 4, and 5. With reference to FIG. 6, there is shown an exemplary scenario 600 to register a new user, such as a new user 402e. The new user 402e may correspond to the pre-specified domain 402 (FIG. 4).

With reference to FIG. 6, the new user 402e may provide the biometric information 404e. In accordance with an embodiment, the processor 202 may retrieve a vault file associated with at least one user associated with the pre-specified domain 402. The processor 202 may retrieve the vault file 406a that corresponds to the user 402a. The processor 202 may be further operable to determine the random number "R", from the vault file 406a, as described in FIG. 3B. In accordance with an embodiment, the processor 202 may be operable to store the random number "R", in the secure volatile memory 114. The processor 202 may encrypt the random number "R", based on the biometric information 404e, as described in FIG. 3A. The processor 202 may generate a vault file 406e that corresponds to the new user 402e. Consequently, the new user 402e may also be included in the group of users that correspond to the pre-specified domain 402. In accordance with an embodiment, the vault file 406e may include the encrypted value of the random number "R". The processor 202 may be further operable to delete the random number "R", from the secure volatile memory 114, once the new user 402e is registered. In accordance with an embodiment, the processor 202 may be further operable to store the vault file 406e in the non-secure file system 104.

Figure 7:
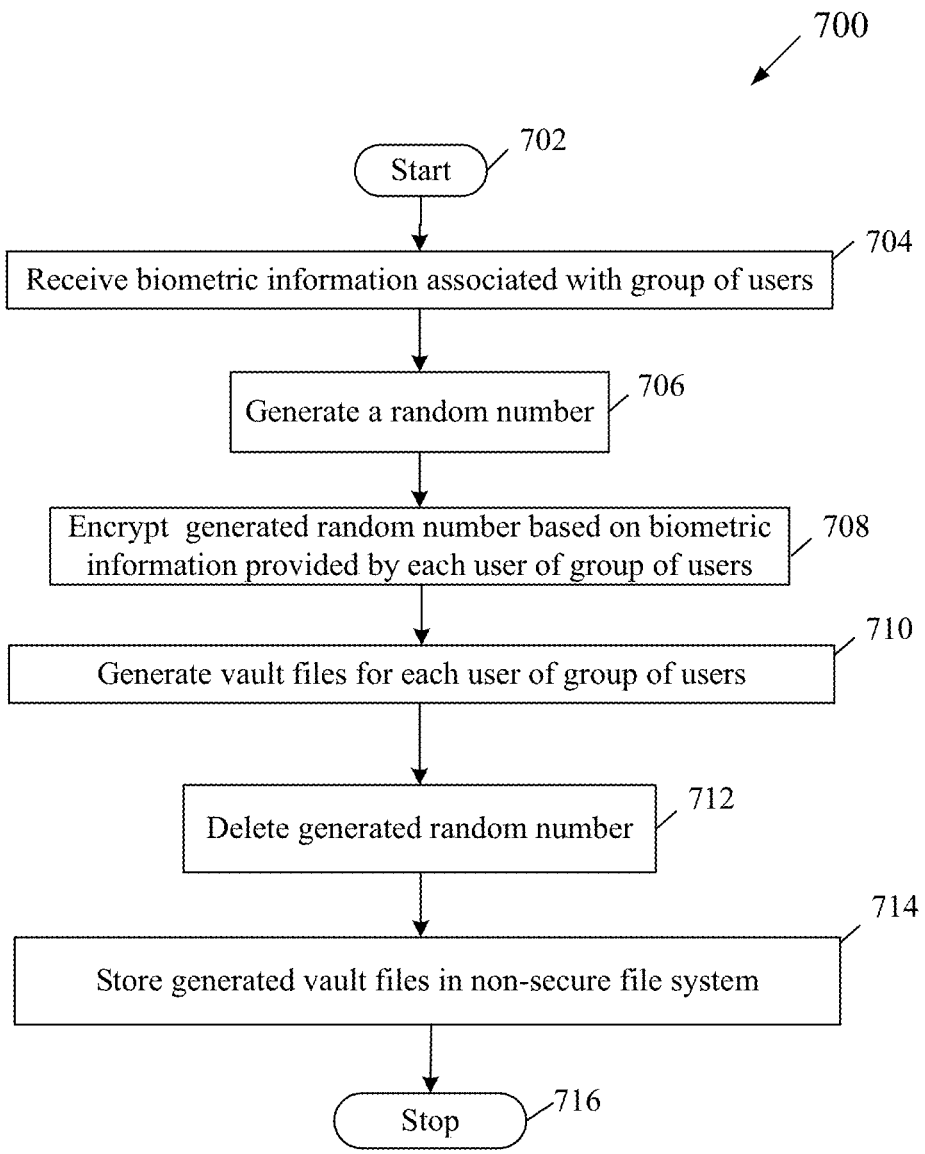
FIG. 7 is a flowchart that illustrates a method for digital rights management, in accordance with an embodiment of the disclosure.

FIG. 7 is a flow chart that illustrates a method for digital rights management, in accordance with an embodiment of the disclosure. With reference to FIG. 7, there is shown a flow chart 700. The flow chart 700 is described in conjunction with FIGS. 1 to 6. The method starts at step 702 and proceeds to 704.

At step 704, the biometric information associated with the group of users 402a to 402d may be received. At step 706, a random number "R", may be generated. At step 708, the generated random number "R", may be encrypted based on the biometric information 404a to 404b, which may be provided by each user of the group of users 402a to 402d, respectively. At step 710, vault files 406a to 406d may be generated based on the encrypted random number and the fuzzy vault encoding mechanism. At step 712, the generated random number "R", may be deleted from the memory. At step 714, the generated vault files 406a to 406d may be stored in the non-secure file system 104. Control passes to end step 716.

Figure 8:
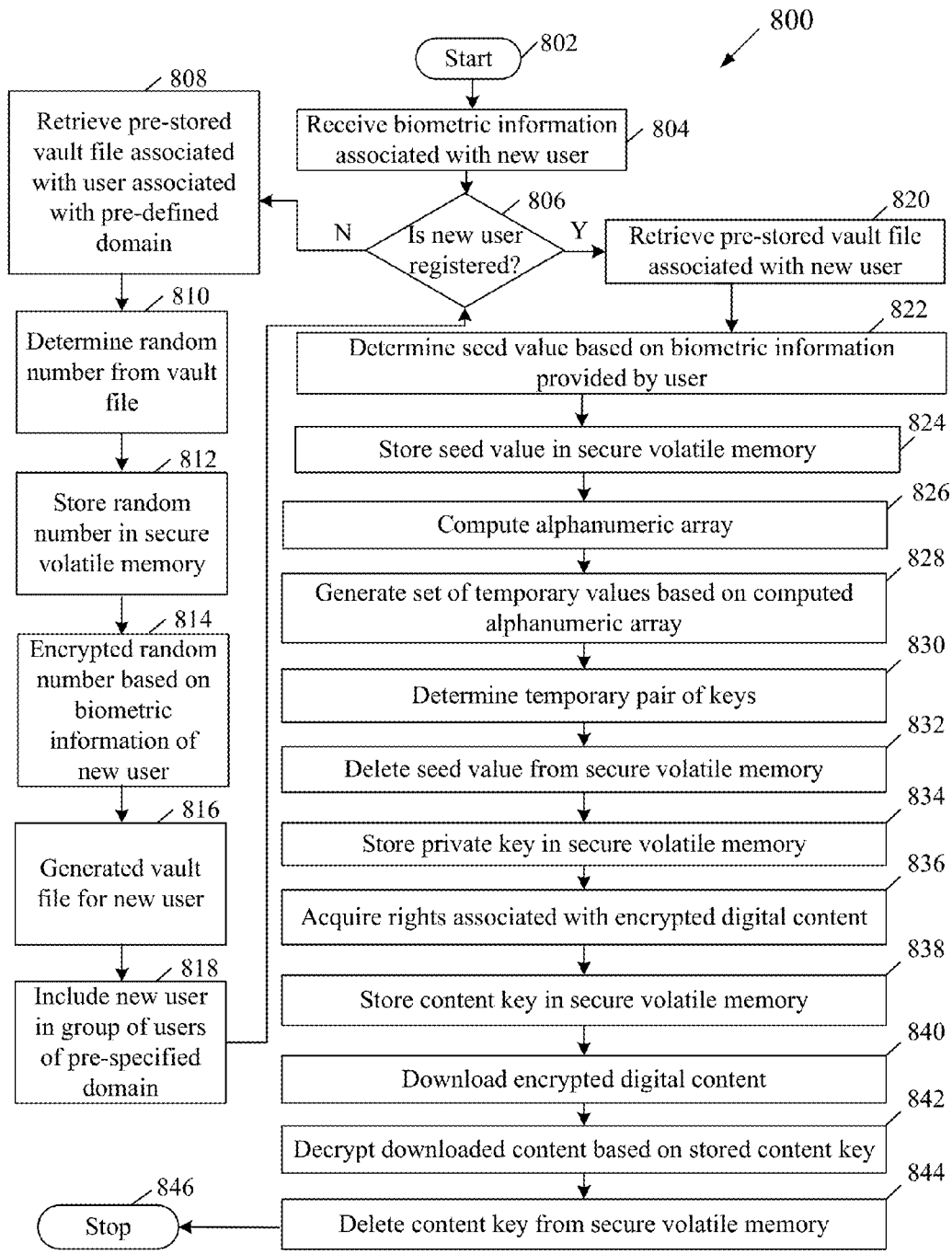
FIG. 8 is a flowchart that illustrates another method for digital rights management, in accordance with an embodiment of the disclosure.

FIG. 8 is a flow chart that illustrates another method for digital rights management, in accordance with an embodiment of the disclosure. With reference to FIG. 8, there is shown a flow chart 800. The flow chart 800 is described in conjunction with FIGS. 1 to 6. The method starts at step 802 and proceeds to 804.

At step 804, the biometric information associated with a new user, such as the new user 402e, may be received by the electronic device. The biometric information may be used for the playback of the common encrypted digital content on the electronic device 102. At step 806, it may be determined that the new user 402e is a registered user. In an instance where the new user 402e is not a registered user, the control passes to step 808. At step 808, a vault file, such as 406a, associated with at least one user, such as 402a, associated with the pre-specified domain 402, may be retrieved. At step 810, the random number "R", may be determined from the vault file 406a. At step 812, the random number "R", may be stored in the secure volatile memory 114. At step 814, the random number "R", may be encrypted based on the biometric information 404e of the new user 402e, as described in FIG. 3A. At step 816, the vault file 406e may be generated that corresponds to the new user 402e. The vault file 406e may be stored in the non-secure file system 104. At step 818, the new user 402e may be included in the group of users that correspond to the pre-specified domain 402. The random number "R", may be deleted from the secure volatile memory 114, once the new user 402e is registered. The control passes to step 820.

In an instance where the new user 402e is a registered user, the control passes to step 820. At step 820, one of the pre-stored vault files, such as the vault file 406e, which corresponds to the new user 402e, may be retrieved from the non-secure file system 104. At step 822, the seed value may be determined based on the biometric information 404e provided by the new user 402e. At step 824, the seed value may be stored in the secure volatile memory 114.

At step 826, the alpha-numeric array, may be computed based on the seed value and the pre-determined rule. At step 828, the set of intermediate values may be generated. The set of intermediate values may comprise the first pair and the second pair of intermediate values. The first pair may be generated based on the computed alpha-numeric array "A", and the pre-configured criterion. The second pair may be generated based on the generated first pair of intermediate values and the pre-configured criterion. At step 830, the temporary pair of keys may be determined based on the second pair of the set of intermediate values. The temporary pair of keys may comprise the public key and the private key.

At step 832, the stored seed value may be deleted from the secure volatile memory 114. At step 834, the private key may be stored in the secure volatile memory 114. At step 836, the one or more rights that may correspond to the encrypted digital content may be acquired from the rights acquisition server 106. The one or more rights and the private key may be used to determine the content key "CK" and/or the set of playback rules. At step 838, the content key "CK", may be stored in the secure volatile memory 114. At step 840, the encrypted digital content may be downloaded from the content server 108. At step 842, the downloaded encrypted digital content may be decrypted based on the stored content key "CK". The decrypted digital content may be played back based on the set of playback rules. At step 844, the stored content key "CK", and the private key may be deleted from the secure volatile memory 114. Control passes to end step 846.

In accordance with an embodiment of the disclosure, a system for digital rights management of encrypted digital content may comprise the electronic device 102 (FIG. 1). The electronic device 102 may comprise one or more processors, such as the processor 202 (FIG. 2). The processor 202 may be operable to determine a seed value from a pre-stored vault file "VA" (FIG. 2) that corresponds to the user 118 (FIG. 1). The determined seed value may be based on biometric information provided by the user 118. The processor 202 may further generate a set of intermediate values based on the determined seed value. The generation of the set of intermediate values may be based on a pre-determined rule. The processor 202 may further determine a content key "CK" (FIG. 2) based on the generated set of intermediate values.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for digital rights management of encrypted digital content. The at least one code section in an electronic device may cause the machine and/or computer to perform the steps that comprise determination of a seed value from a pre-stored vault file. The determination may be based on biometric information provided by a user. The pre-stored vault file may correspond to the user. A set of intermediate values may be generated based on the determined seed value. The generation of the set of intermediate values may be done based on a pre-determined rule. The method may further comprise determination of an intermediate content key based on the generated set of intermediate values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for digital rights management (DRM) of encrypted digital content, the method comprising:
   in an electronic device: generating a first seed value from encrypted information in a vault file based on biometric information provided by a user, wherein said vault file corresponds to said user;
   computing an alpha-numeric array based on said generated first seed value and a rule, wherein based on said rule, re-generation of said first seed value is impossible from said computed alpha-numeric array;
   generating a set of intermediate values based on said computed alpha-numeric array;
   and
   determining a content key based on said generated set of intermediate values.

2. The method according to claim 1, wherein said generated first seed value comprises at least one of a numeric string or an alpha-numeric string.

3. The method according to claim 1, wherein said first seed value corresponds to said encrypted digital content, and wherein said encrypted digital content is hosted on a content server associated with said electronic device.

4. The method according to claim 1, wherein said vault file is generated based on a fuzzy vault mechanism during registration of said user.

5. The method according to claim 4, further comprising storing said generated vault file in a file system associated with said electronic device.

6. The method according to claim 1, further comprising storing said first seed value in a local memory for a current session.

7. The method according to claim 1, wherein a first pair of said set of intermediate values is generated based on selecting a first pair of byte arrays with same size from said computed alpha-numeric array, selecting a second pair of byte arrays of different sizes from said computed alpha-numeric array, overlapping said selected first pair of byte arrays and said selected second pair of byte arrays from said computed alpha-numeric array, and at least one of combining said selected first pair of byte arrays and said selected second pair of byte arrays with a byte from said computed alpha-numeric array or multiplying said selected first pair of byte arrays and said selected second pair of byte arrays with a numeric value from said computed alpha-numeric array.

8. The method according to claim 7, wherein a second pair of said set of intermediate values is generated based on choosing a nearest prime number with respect to said generated first pair of said set of intermediate values.

9. The method according to claim 7, further comprising determining a first pair of keys based on said generated set of intermediate values.

10. The method according to claim 9, further comprising generating a second pair of keys based on said biometric information and a second seed value, wherein said second pair of keys are generated based on a determination that said generated first pair of keys are at least one of stolen, hacked or inoperative.

11. The method according to claim 9, further comprising deleting said first seed value based on a determination of said first pair of keys.

12. The method according to claim 9, wherein said determined first pair of keys comprise a private key and a public key.

13. The method according to claim 12, further comprising storing said private key in a local memory for a current session.

14. The method according to claim 12, further comprising acquiring rights associated with said encrypted digital content based on said private key.

15. The method according to claim 14, wherein said acquired rights comprise at least one of said content key or a set of content playback rules.

16. The method according to claim 15, further comprising storing said content key in a local memory for a current session.

17. The method according to claim 16, further comprising downloading said encrypted digital content from a content server configured to host said encrypted digital content.

18. The method according to claim 17, further comprising decrypting said downloaded encrypted digital content based on said stored content key.

19. The method according to claim 18, further comprising deleting said private key or said stored content key based on decryption of said downloaded encrypted digital content.

20. A video content processing system, comprising:
   one or more processors in an electronic device configured to: generate a seed value from encrypted information in a vault file based on biometric information provided by a user, wherein said vault file corresponds to said user;
   compute an alpha-numeric array based on said generated seed value and a rule, wherein based on said rule, re-generation of said seed value is impossible from said computed alpha-numeric array;
   generate a set of intermediate values based on said computed alpha-numeric array;

and
determine a content key based on said generated set of intermediate values.

21. A non-transitory computer-readable medium having stored thereon, computer-readable instructions which when executed by a computer, cause the computer to execute operations, the operations comprising:
generating a seed value from encrypted information in a vault file based on biometric information provided by a user, wherein said vault file corresponds to said user;
computing an alpha-numeric array based on said generated seed value and a rule, wherein based on said rule, re-generation of said seed value is impossible from said computed alpha-numeric array;
generating a set of intermediate values based on said computed alpha-numeric array;
and
determining a content key based on said generated set of intermediate values.

* * * * *